(12) United States Patent
Nakayama

(10) Patent No.: US 7,287,861 B2
(45) Date of Patent: Oct. 30, 2007

(54) DISPLAY OPTICAL SYSTEM AND IMAGE PROJECTOR

(75) Inventor: Hiroki Nakayama, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 11/086,967

(22) Filed: Mar. 22, 2005

(65) Prior Publication Data

US 2005/0213057 A1     Sep. 29, 2005

(30) Foreign Application Priority Data

Mar. 26, 2004  (JP) ............................... 2004-093568

(51) Int. Cl.
*G03B 21/00* (2006.01)
*G03B 21/20* (2006.01)
*G03B 21/26* (2006.01)

(52) U.S. Cl. ........................... 353/31; 353/30; 353/102

(58) Field of Classification Search .................. 353/30, 353/31, 33, 37, 69, 81, 102
See application file for complete search history.

(56) References Cited

U.S. PATENT DOCUMENTS

| 6,247,816 | B1 * | 6/2001 | Cipolla et al. ................. 353/31 |
| 6,457,829 | B1 | 10/2002 | Nakazawa |
| 6,590,714 | B2 | 7/2003 | Sugawara |
| 6,652,103 | B2 * | 11/2003 | Chiang ......................... 353/31 |
| 6,672,724 | B1 * | 1/2004 | Peterson et al. .............. 353/81 |
| 2002/0140905 | A1 * | 10/2002 | Ouchi et al. .................. 353/31 |
| 2003/0214617 | A1 * | 11/2003 | Bierhuizen et al. .......... 349/113 |
| 2004/0027543 | A1 * | 2/2004 | Ouchi et al. .................. 353/31 |
| 2005/0057729 | A1 * | 3/2005 | Huang .......................... 353/33 |
| 2005/0140939 | A1 * | 6/2005 | Yamamoto ................... 353/102 |

FOREIGN PATENT DOCUMENTS

| JP | 08-201756 A | 8/1996 |
| JP | 11-231218 A | 8/1999 |

* cited by examiner

*Primary Examiner*—Rodney Fuller
(74) *Attorney, Agent, or Firm*—Canon U.S.A. Inc I.P. Div

(57) ABSTRACT

A display optical system and an image projector incorporating the same. The display optical system includes a light source operable to emit light; a plurality of reflective light-modulating devices; a plurality of optical elements; a projection optical system including at least one refractive lens; and an optical curved-surface having a finite radius of curvature and interposed between the projection optical system and at least one of the plurality of reflective light-modulating devices, wherein the optical elements are arranged to guide light from the light source to the reflective light-modulating devices and to guide outgoing light from the reflective light-modulating devices to the projection optical system, and wherein the at least one refractive lens of the projection optical system projects incoming light to a predetermined plane.

11 Claims, 9 Drawing Sheets

LATERAL CHROMATIC
ABERRATION OF LENS (A)

LATERAL CHROMATIC
ABERRATION OF LENS AND
PRISM CURVATURE CORRECTION (B)

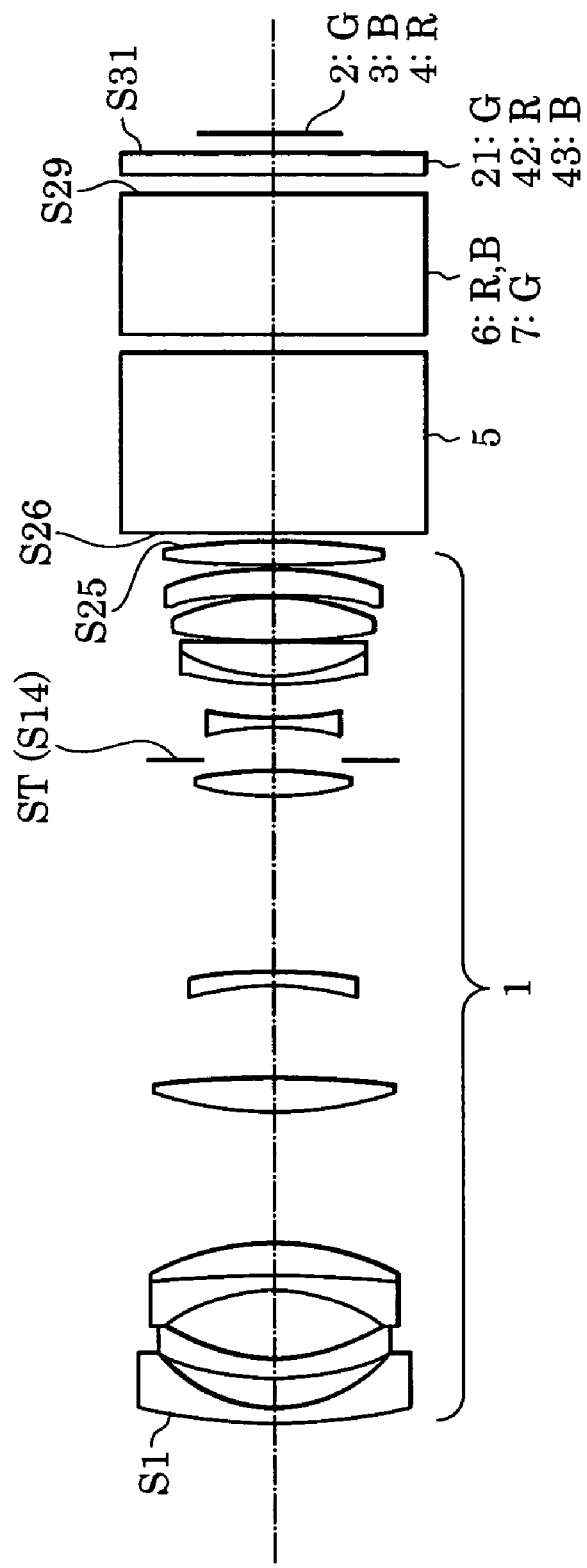

DISPLAY OPTICAL SYSTEM AND IMAGE PROJECTOR

BACKGROUND OF THE INVENTION

1. Field of the Invention

The present invention relates to a display optical system for projecting light from a reflective light-modulation device and to an image projector including the display optical system.

2. Description of the Related Art

When colors are combined using a known color-combining prism and a projection lens, it is difficult to make the projected images of each color completely coincide on a projection surface, such as a screen, because of the lateral chromatic aberration of the projection lens. In general, a reflective liquid crystal projector has a long back-focus compared to a transmissive liquid crystal projector. Therefore, it is difficult to provide a lens structure suitable for a reflective liquid crystal projector having a wide-angle lens since lateral chromatic aberration of the reflective liquid crystal projector tends to become large.

Taking these problems into consideration, a display optical system capable of correcting the lateral chromatic aberration of the projection lens is known. Such a projection lens is capable of correcting the lateral chromatic aberration of the projection lens by changing the focal length or the position of a field lens disposed in each light path of each color of light. The field lens is disposed between a liquid crystal panel and a color combining system, including two dichroic mirrors and a reflective mirror (Refer to Japanese Patent Laid-Open No. 8-201756).

Furthermore, a display optical system capable of correcting the lateral chromatic aberration of the projection lens having a correcting lens interposed between a liquid display panel and a color-combining prism, which is a cross-dichroic prism, has been proposed (Refer to Japanese Patent Laid-Open No. 11-231218 and U.S. Pat. No. 6,457,829).

The inventors have proposed a technology for providing refractive power to the incident surface or an inner surface of a prism of a display optical system using a transmissive liquid crystal panel. (Refer to Japanese Patent Laid-Open No. 2002-55210, corresponding to U.S. Pat. No. 6,590,714)

However, since the color-combining system of the display optical system disclosed in Japanese Patent Laid-Open No. 8-201756 includes two dichroic mirrors and a reflective mirror, in addition to the lateral chromatic aberration caused by the projection lens, distortion of the image occurs because the color channels of the light transmitted through the dichroic mirrors are distorted due to the distortion of the surfaces of the dichroic mirrors. As a result, the size of the projected image for each color channel does not match the calculated size, and, thus, the magnification for each color channel is not corrected effectively.

The display optical system disclosed in Japanese Patent Laid-Open No. 11-231218 and U.S. Pat. No. 6,457,829 includes a cross-dichroic prism having four right-angled triangular prisms functioning as a color-combining system. Therefore, in addition to the lateral chromatic aberration of the projection lens, deformation of the projected image occurs due to the bending of the dichroic mirror caused by angular error of the prisms. Consequently, it is difficult to completely match the projected images for the three colors: red, green, and blue.

The display optical system disclosed in Japanese Patent Laid-Open No. 2002-55210 is similar to the display optical systems disclosed in the above-mentioned documents in that the lateral chromatic aberration is corrected in a transmissive liquid crystal projector having a short back-focus. However, there is no disclosure made for correcting the lateral chromatic aberration for a reflective liquid crystal projector having a long back-focus.

Accordingly, there is a need for a display optical system capable of effectively correcting the lateral chromatic aberration for a reflective image projector having a longer back-focus compared to the back-focus of a transmissive image projector.

SUMMARY OF THE INVENTION

The present invention is directed to a display optical system. The display optical system includes a light source, a plurality of reflective light-modulating devices, a plurality of optical elements, a projection optical system, and an optical curved surface. The light source is operable to emit light. The projection optical system includes at least one refractive lens. The optical curved-surface has a finite radius of curvature and is interposed between the projection optical system and at least one of the plurality of reflective light-modulating devices. The optical elements are arranged so as to guide light from the light source to the reflective light-modulating devices and to guide outgoing light from the reflective light-modulating devices to the projection optical system. The at least one refractive lens of the projection optical system projects incoming light to a predetermined plane.

The display optical system separates light from the light source into a first color component, a second color component having a shorter wavelength than the first color component, and a third color component having a longer length than the first color component, guides the first to third color components to first to third reflective light-modulating devices, respectively, combines the first to third color components from the first to third reflective light-modulating devices, respectively, and guides the combined color components to the projection lens. The optical curved-surfaces of the display optical system are disposed in light paths of the second and third color components so as to shorten the combined focal length of the projection lens and the second and third reflective light-modulating devices in comparison to the focal length of the projection lens for the first color component.

The display optical system separates light from the light source into a first color component, a second color component having a shorter wavelength than the first color component, and a third color component having a longer wavelength than the first color component, guides the first to third color components to the first to third reflective light-modulating devices, respectively, combines the first to third color components from first to third reflective light-modulating devices, respectively, and guides the combined color components to the projection lens. The optical curved-surfaces of the display optical system is disposed in a light path of the first color component so as to lengthen the combined focal length of the projection lens and the first reflective light-modulating device in comparison to the focal lengths of the projection lens for the second and third color components.

The display optical system separates light from the light source into a first color component, a second color component having a shorter wavelength than the first color component, and a third color component having a longer wavelength than the first color component, guides the first to third color components to the first to third reflective light-modulating devices, respectively, combines the first to third color components from first to third reflective light-modulating devices, respectively, and guides the combined color components to the projection lens. The display optical system satisfies at least one of formulae:

$$1.5<(F_1-F_2)/(F_10-F_20)<4.0$$

and $$1.5<(F_30-F_10)/(F_3-F_1)<4.0$$

where, $F_1$, $F_2$, and $F_3$ represent the combined focal lengths of the projection lens and the reflective light-modulating devices including the optical curved-surfaces for the first, second, and third color components, respectively, and $F_10$, $F_20$, and $F_30$ represent the focal distances for the projection lens for the first, second, and third color components, respectively.

The present invention is also directed to an image projector including an aperture stop and the display optical system described above.

Further features and advantages of the present invention will become apparent from the following description of exemplary embodiments (with reference to the attached drawings).

BRIEF DESCRIPTION OF THE DRAWINGS

FIG. 3 is a cross-sectional view of the structure of a projection lens according to an embodiment of the present invention.

DESCRIPTION OF THE EMBODIMENTS

Figure 1:
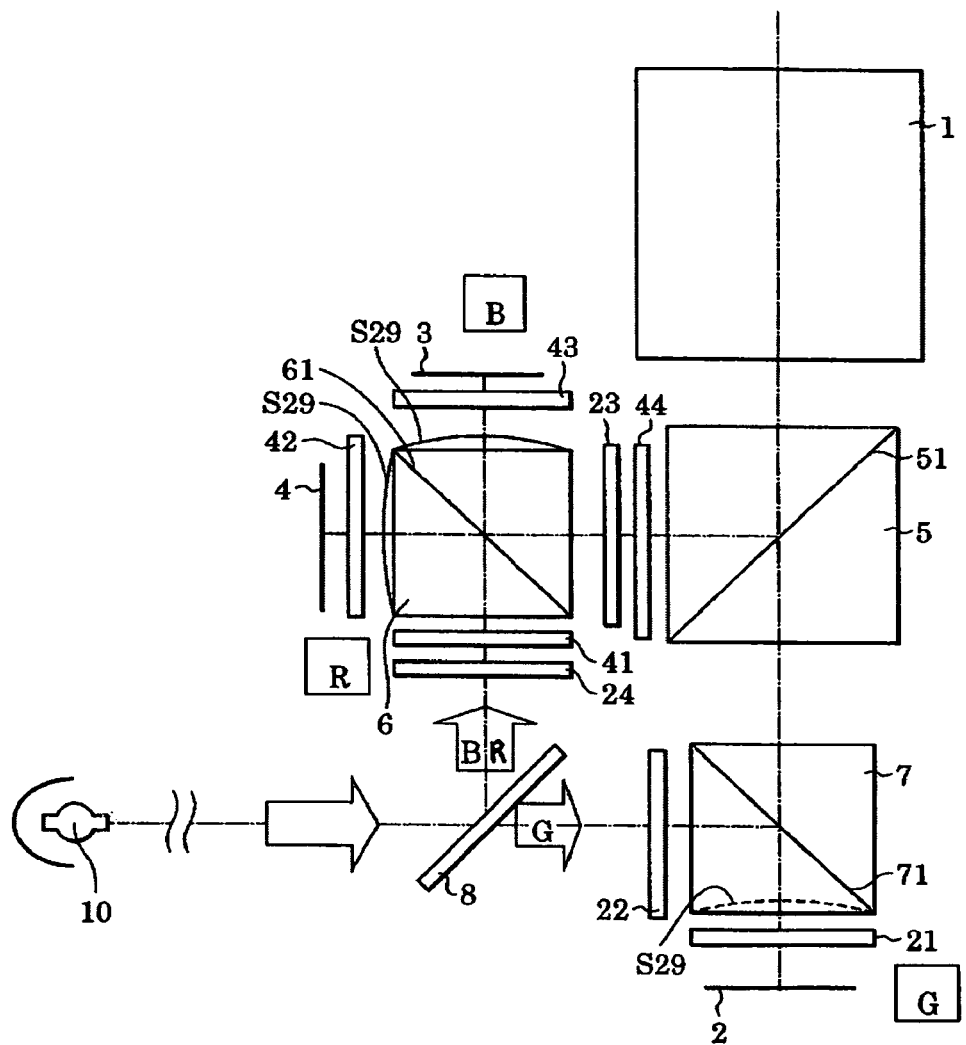
FIG. 1 is a cross-sectional view of a display optical system according to one embodiment of the present invention.

Embodiments of the present invention will be described below with reference to the drawings.

First, an overview of the present invention will be described. The present invention provides a display optical system for projecting an image on a projection surface, such as a screen, by transmitting light through a projection lens from a plurality of reflective light-modulating devices. The projection lens may contain a mirror, a diffraction optical element, etc., but it is necessary to include at least one refraction lens. The projection lens is an example of an optical system. The display optical system according to the present invention includes at least two color-combining prism blocks having sufficient spacing therebetween, interposed between the projection lens and the reflective light-modulating devices. Moreover, an optical curved-surface having a finite radius of curvature is provided between the projection lens and at least one of the reflective light-modulating devices.

Light emitted from a light source is separated into three color components: green (G), red (R), and blue (B). The color components reach the reflective light-modulating devices corresponding to each color. The reflective color-modulating devices reflect and modulate the incident light. The modulated components pass through or are reflected at a dichroic surface and/or a polarization splitting surface, provided in the light paths of each color component, and reach the projection lens. Then, each color component is projected onto the screen.

The combined focal lengths from the light-modulating devices to the screen, including the projection lens, for the green, blue, and red components are denoted by $Fg(F_1)$, $Fb(F_2)$, and $Fr(F_3)$, respectively. When optical curved-surfaces having a finite radius of curvature are not interposed between the projection lens and the light-modulating devices and the focal distances for the green, blue, and red components of the projection lens are $Fg0(F_10)$, $Fb0(F_20)$, and $Fr0(F_30)$, respectively, at least one of the following formulae should be satisfied:

$$1.5<(Fg-Fb)/(Fg0-Fb0)<4.0 \quad (1)$$

$$1.5<(Fr0-Fg0)/(Fr-Fg)<4.0 \quad (2)$$

The combined focal length is a focal length of the optical system (this optical system is an optical system constituted by all the optical elements arranged between the optical modulating device and a screen.) from the (reflective) optical modulating device to the screen to each wavelength (red, green, and blue light, desirable, the light of the wavelength of the center of the light of each color, for example, the light of 470 nm, 550 nm, 620 nm). Specifically, it is a focal length of the combined optical system of the projection lens and the optical curved surface.

When the green component is taken as a reference, the lateral chromatic aberration for the red and blue components ($\Delta R$ and $\Delta B$, respectively) of the reduction side of the optical system (projection lens) for when the object height is Y, the green image height on the image-forming side of the optical system (projection lens) is yg, the red image height is yr, and the blue image height is yb, are represented by the following formulae:

$$\Delta R=yr-yg$$

$$\Delta B=yb-yg$$

The magnification ratios for the red and blue components are yr/yg and yb/yg, respectively.

The projection magnification based on green is yg/Y and is proportional to the focal distance of light having a wavelength corresponding to green. This is also true for the other colors and can be represented by the following formulae:

$$yg/Y \approx fg/\text{distance (distance to screen)}$$

$$yr/Y \approx fr/\text{distance (distance to screen)}$$

$$yb/Y \approx fb/\text{distance (distance to screen)} \tag{3}$$

Here, fg, fr, and fb represent the distances to the projection lens for light having wavelengths corresponding to green, red, and blue, respectively.

Accordingly, the magnifications for beams of light having wavelengths corresponding to each color are proportional to the focal distances of light having wavelengths corresponding to each color.

If there is no difference in the focal distances for the beams of light having different wavelengths, no lateral chromatic aberration will be observed. However, lateral chromatic aberration cannot be reduced to zero if a projection lens is used for the reflection system, because light is dispersed by the glass projection lens.

In general, the relationship between the focal distances for each color component is fb<fg<fr due to the refractive index of glass for each color. This relationship is maintained for the magnification of an image having a short image height. However, for an image having a higher image height, the relationship between the image heights becomes yb>yg and yr>yg due to aberration. To correct this by using an optical system not including a projection lens, this optical system should satisfy at least one of formulae (1) and (2).

Furthermore, in such a case, set the curvature of the optical curved-surface so that the relationship between the focal distances for each color satisfies fb<fg<fr. This relationship, fb<fg<fr, may be achieved by adjusting the curvature of a plurality of surfaces or by adjusting the curvature of one surface.

More specifically, the lateral chromatic aberration of the projection lens should be within ½ to 1 pixel of the light-modulating device. If, for example, a liquid crystal element is used as the light-modulating device, the pixel size is about 1/1000 to 1/500 of the diagonal length of the light-modulating device. Here, if the focal distance of the wide-angle end of the entire optical system is, for example, about 1 to 2 times the diagonal length of the light-modulating device, the difference in magnification of the component equals the ratio of the focal distance of that color.

In such a case, to eliminate the lateral chromatic aberration, the combined refractive powers from the reduction side of the projection lens to the light-modulating device may be set to satisfy the following formulae (4) and (5), when the combined focal distances to the light-modulating devices, including the projection lens, for the blue and red components are Fb and Fr, respectively, and when the focal distances for the blue and red components of the projection lens, without optical curved-surfaces having a finite radius of curvature being disposed between the projection lens and the light-modulating devices, are Fb0 and Fr0, respectively:

$$1.0001 < Fb0/Fb < 1.0005 \tag{4}$$

$$1.0001 < Fr0/Fr < 1.0005 \tag{5}$$

Alternatively, to eliminate the lateral chromatic aberration, the combined refractive power from the reduction side of the projection lens to the light-modulating device may be set to satisfy the following formula (6), when the combined focal distance for the green component with an optical surface relatively disposed only at the light path of the green component is Fg and when the focal distance for the green component of the projection lens without an optical surface having a finite radius of curvature being disposed between the projection lens and the light-modulating device is Fg0:

$$1.0001 < Fg0/Fg < 1.0005 \tag{6}$$

The above-mentioned green, red, and blue components are, for example, beams of light having wavelengths of about 550 nm, 620 nm, and 470 nm, respectively.

If the reduction side of the projection lens is substantially telecentric, the size of the projected image is mostly unaffected even when the focus position is moved in correspondence to the change in the focal distance.

Figure 7:
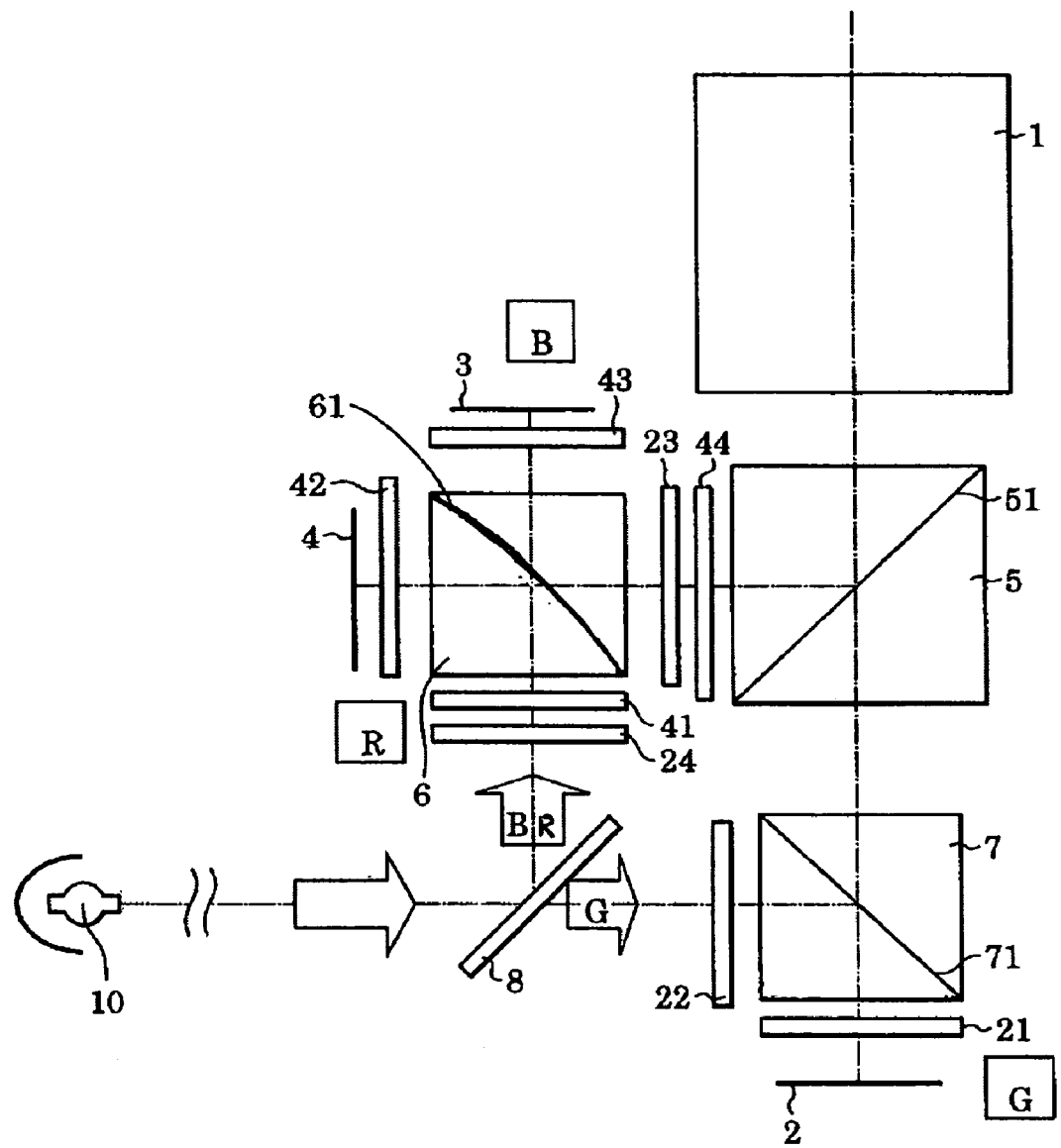
FIG. 7 is a cross-sectional view of a display optical system according to another embodiment of the present invention.
Figure 8:
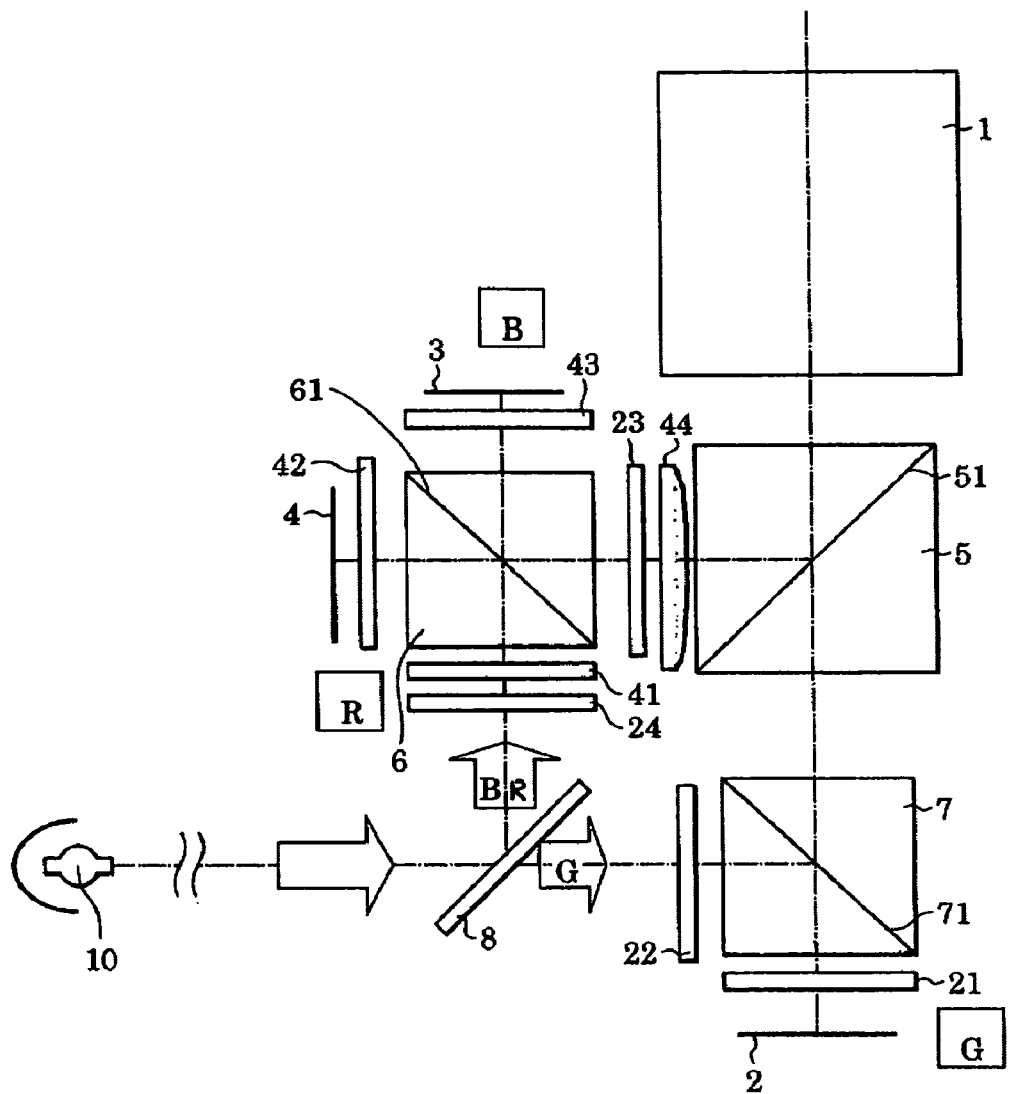
FIG. 8 is a cross-sectional view of a display optical system according to another embodiment of the present invention.
Figure 9:
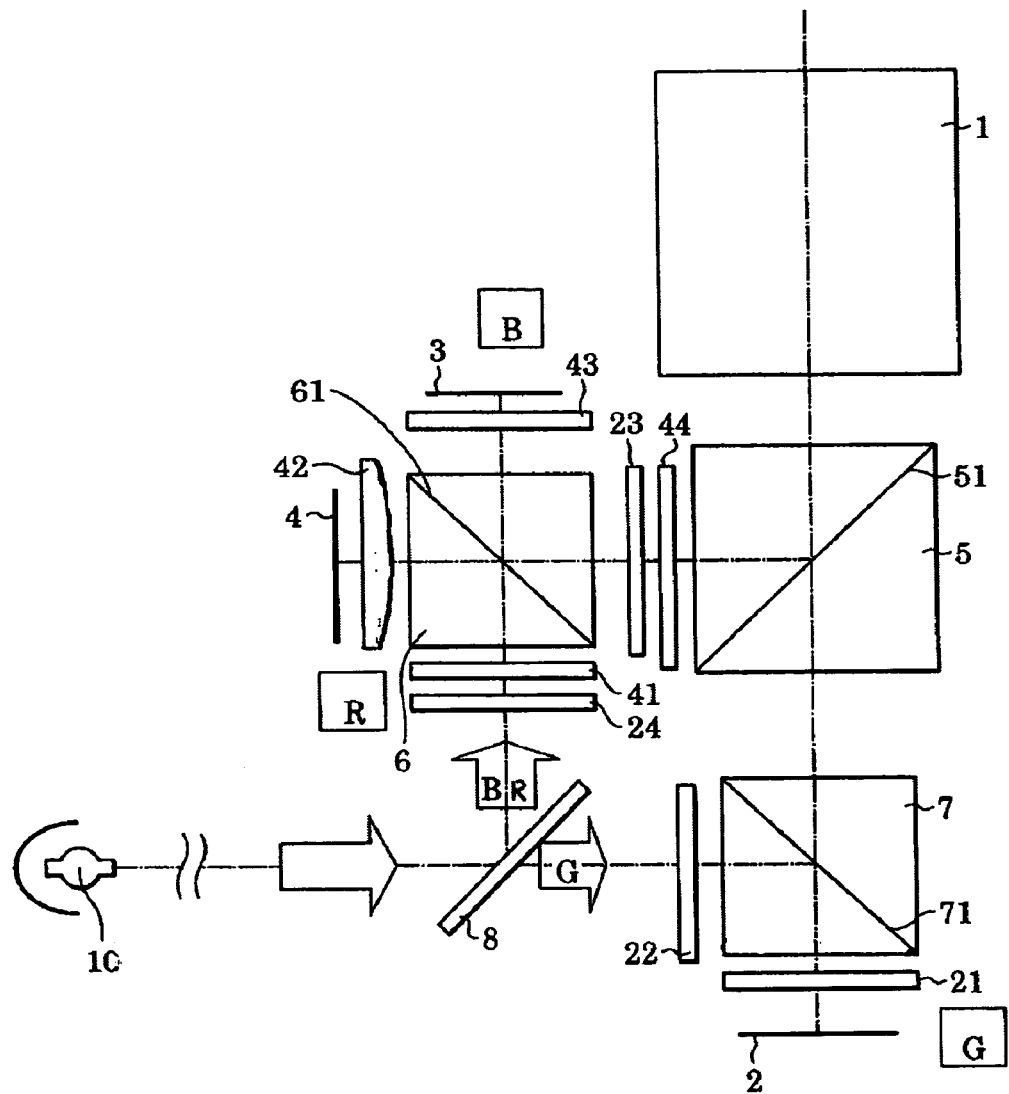
FIG. 9 is a cross-sectional view of a display optical system according to another embodiment of the present invention.

To obtain the above-described structure, an optical curved-surface having a finite radius of curvature and being disposed between the projection lens and the light-modulating device may be provided in the form of an incident surface or a projection surface of the above-mentioned prism, a bonded surface having a 45° incident surface 51, 61, 71 (FIG. 7) for the above-mentioned prism, or a surface of a wavelength-selective polarization rotational element (color-selecting element) 44 (FIG. 8) or a polarization changing element 42, 43, 21 (FIG. 9) for changing the polarization direction of light in a predetermined wavelength band. Instead of providing an optical curved-surface as pad of an optical element, such as the above-mentioned prism, a sheet having an optical curved-surface may be attached to a surface of the optical element. In this way, special elements, such as a correcting lens, and supports are not required for correcting the lateral chromatic aberration.

When L represents the light path in air between the projection lens and the light-modulating device, and D represents the diagonal size of the light-modulating device, the following formula is satisfied:

$$L > 2.1D \tag{7}$$

By providing an optical curved-surface having a finite radius of curvature at the above-mentioned position relative to a projection lens that does not satisfy the above-mentioned formula, the performance of the projection lens will be reduced. More specifically, for a projection lens that exceeds the range indicated by the above-mentioned formula, the optical curved-surface having a finite radius of curvature will be too close to the display surface of the light-modulating device and, thus, the curvature will have to be significantly increased to correct the lateral chromatic aberration. As a result, the image plane will be curved greatly. Moreover, the optical curved-surface having a finite curvature will be disposed extremely close to the projection lens. This causes coma and curving of the image plane to easily occur. Therefore, it is desirable to dispose an optical curved-surface having a finite curvature at the above-described position in an optical system satisfying the above-mentioned formula (7).

Since the display optical system according to the present invention is included in a reflective image projector, the prism interposed between the projection lens and the plurality of light-modulating elements is also used for guiding light from a light source to the light-modulating devices. Furthermore, since the optical curved-surface having a finite curvature is disposed in the light path from the light source to the light-modulating devices, unevenness in illumination for a predetermined color of light can also be effectively corrected by the curvature.

In particular, the following formulae are satisfied:

$$|Fw/fc|<0.002 \qquad (8)$$

or $$|Fw/fc|<0.0015, \qquad (8a)$$

and further $$0.0001<|Fw/fc| \qquad (8b)$$

or $$0.0003<|Fw/fc| \qquad (8c)$$

Here, Fw represents the focal distance of the wide-angle end of the projection lens and fc represents the focal distance of the optical curved-surface having a finite curvature and being interposed between the projection lens and the light-modulating devices.

If formula (8a) is not satisfied, field curvature will occur due to the optical curved-surface interposed between the projection lens and the light-modulating devices, the image planes for the three colors will not coincide, and the lateral chromatic aberration will be overly corrected. Sufficient correction effect (the aberration reduction effect) to a lateral chroic aberration is no longer acquired unless it satisfies the formula (8b) or (8c). Therefore, it is not desirable.

Now, details of embodiments of the present invention will be described. FIG. 1 is a schematic view of the display optical system according to one embodiment of the present invention. The display optical system according to an embodiment of the present invention includes a projection lens 1, reflective light-modulating devices for green, blue, and red components 2, 3, and 4, respectively, polarization beam splitters 5, 6, and 7, a dichroic mirror 8 capable of transmitting a green light component, polarization plates 22, 24, and 44, ¼ wave plates 21, 42 and 43, wavelength-selective polarization rotating elements 23 and 41, and polarization splitting surfaces 51, 61, and 71.

White light emitted from a light source 10 is polarized in a predetermined direction (in this case, polarized into S-polarized light) by a polarization changing element (not shown in the drawing). The polarized light enters the dichroic mirror 8 and is separated into a green component that passes through the dichroic mirror 8 and red and blue components that are reflected at the dichroic mirror 8.

Only the green light component polarized in a predetermined direction by the polarization plate 22 (i.e., S-polarized light relative to the polarization splitting surface 71 described below) is guided to the first polarization beam splitter 7. The light polarized in a predetermined direction is reflected at the polarization splitting surface 71 of the first polarization beam splitter 7 and is directed to the reflective light-modulating device 2 for the green component. The ¼ wave plate 21 is interposed between the first polarization beam splitter 7 and the reflective light-modulating device 2 for the green component. The green light component passes through the first polarization beam splitter 7 and is reflected and modulated at the reflective light-modulating device 2. The green light component passes through the ¼ wave plate 21 twice before returning to the reflective light-modulating device 2. In this way, the polarization direction of the green light component is rotated 90° as compared to its initial polarization direction when it was emitted from the first polarization beam splitter 7 to the reflective light-modulating device 2. Accordingly, the green light component is converted into P-polarized light. The P-polarized green light component passes through the polarization splitting surface 71 of the first polarization beam splitter 7 and is directed to the third polarization beam splitter 5.

Among the blue and red light components, the polarization direction of only the blue component is rotated 90° at the wavelength-selective polarization rotating element 41. Accordingly, the blue light component is converted into P-polarized light. The red light component enters the second polarization beam splitter 6 as S-polarized light. The S-polarized red light component that has entered the second polarization beam splitter 6 is reflected at the polarization splitting surface 61, whereas the P-polarized blue light component passes through the polarization splitting surface 61.

The red and blue light components emitted from the second polarization beam splitter 6 are reflected and modulated at the reflective light-modulating devices 4 and 3, such as LCDs, for the red and blue light components, respectively, and return to the second polarization beam splitter 6.

The ¼ wave plates 42 and 43 are interposed between the second polarization beam splitter 6 and the reflective light-modulating devices 4 and 3, respectively. The red light component emitted from the second polarization beam splitter 6 passes through the ¼ wave plate 42 twice while it is emitted from the second polarization beam splitter 6, reflected at the reflective light-modulating devices 4, and returns to the second polarization beam splitter 6. In this way, the polarization direction of the red light component is rotated 90° compared to when the red light component is emitted from the second polarization beam splitter 6 and reflected at the reflective light-modulating device 4. Accordingly, the red light component is converted into P-polarized light. The blue light component passes through the ¼ wave plate 43 twice as it is emitted from the second polarization beam splitter 6, reflected at the reflective light-modulating device 3, and returns to the second polarization beam splitter 6. In this way, the polarization direction of the blue component is rotated 90° compared to when the blue light component is emitted from the second polarization beam splitter 6 and reflected at the reflective light-modulating devices 3. Accordingly, the blue light component is converted into S-polarized light.

The S-polarized blue light component enters the second polarization beam splitter 6 and is reflected at the polarization splitting surface 61. The P-polarized red component enters the second polarization beam splitter 6 and is transmitted through the polarization splitting surface 61.

Among the blue and red light components emitted from the second polarization beam splitter 6, only the red light component is rotated 90° at the wavelength-selective polarization rotating element 41 and is converted into S-polarized light. Consequently, both the blue and red light components are converted into S-polarized light.

The S-polarized blue and red light components enter the third polarization beam splitter 5 and are reflected at the polarization splitting surface 51 of the third polarization beam splitter 5. The P-polarized green light component that has entered the third polarization beam splitter 5 passes through the polarization splitting surface 51. In this way, the light components of the three different colors are combined and are projected onto a screen (not shown in the drawing) via the projection lens 1.

Each of the first, second, and third polarization beam splitters 7, 6, and 5 include two right-angled triangular glass prisms bonded together. The bonding surfaces, which are 45° to the optical axis, are coated with a polarization splitting film composed of multiple layers.

A typical projection lens has a greater lateral chromatic aberration for the blue light component compared to the light components of other colors. Therefore, lateral chromatic aberration of the blue light component becomes great at the image plane and, thus, the size of the projected image on the screen becomes small. For this reason, an optical curved-surface having a finite radius of curvature is interposed between the projection lens and at least one of the reflective light-modulating devices 2, 3, and 4 so as to relatively shorten the combined focal distance of the blue light component. In this way, the size of the projected image of the blue light component can be increased to match the size of the projected images of the light components of other colors. Accordingly, the lateral chromatic aberration of the blue light component of the projection lens 1 is attenuated (corrected).

A typical projection lens has a greater lateral chromatic aberration for red light compared to other colors of light. Therefore, lateral chromatic aberration of the red light component is great at the image plane and, thus, the size of the projected image on the screen becomes small. For this reason, an optical curved-surface having a finite radius of curvature is interposed between the projection lens and at least one of the reflective light-modulating devices 2, 3, and 4 so as to relatively shorten the combined focal distance of the red light component. In this way, the lateral chromatic aberration of the red light component of the projection lens 1 is attenuated (corrected).

In a common projection lens, green lateral chroic aberration tends to become an under side to the lateral chroic aberration of red or blue when it is compared with the lateral chroic aberration of red or blue. A green projection image generally becomes larger to the other colors when it is compared with other colors. Then, if the combined focal length (this combined focal length is a combined focal length of the optical system arranged between the optical modulating device for green and the surface of projection, such as a screen) of a green channel is arranged so that it becomes longer to the combined focal length of the optical system of other color lights when it is compared with the combined focal length of the optical system of other color lights. Thereby, the green magnification chromatic aberration can be reduced.

Figure 5:
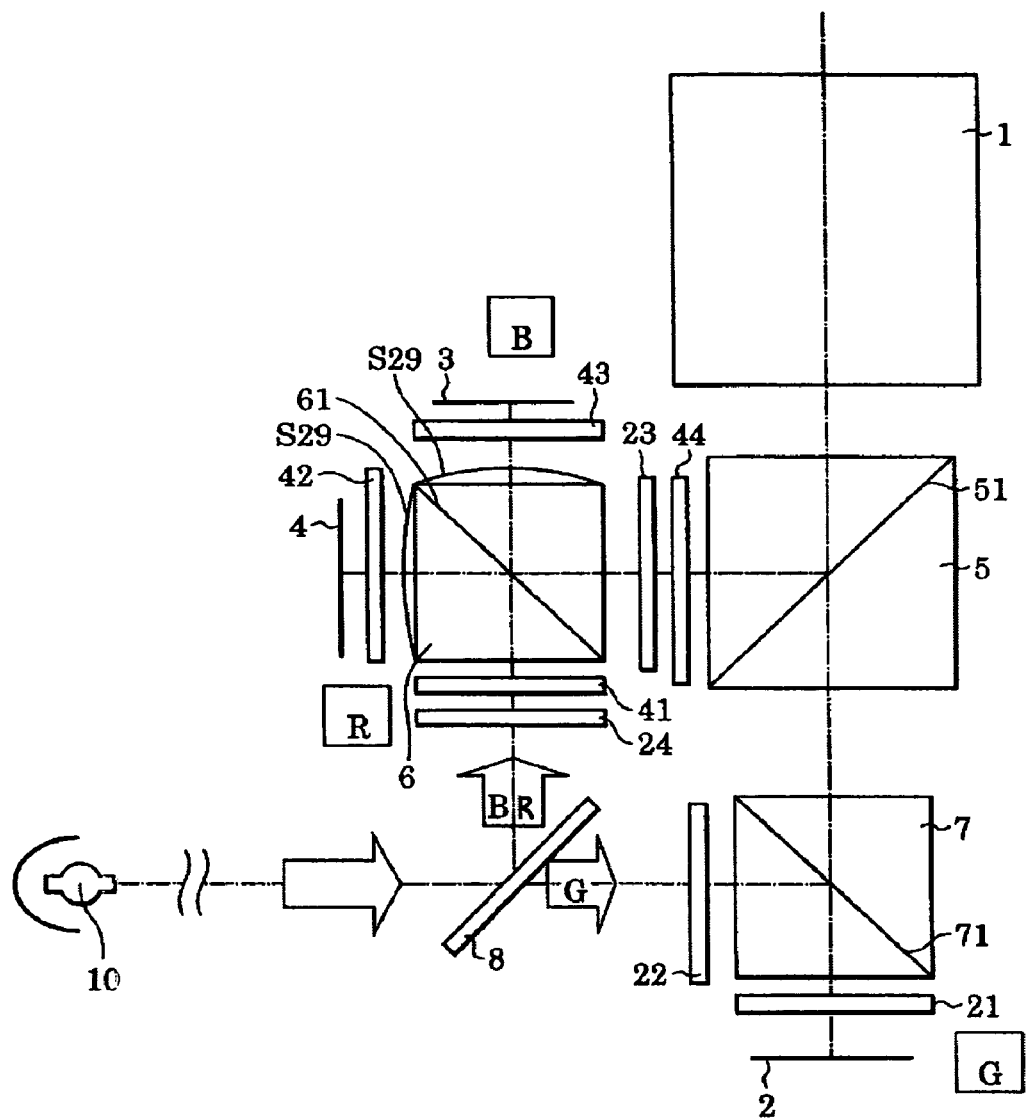
FIG. 5 is a cross-sectional view of a display optical system according to an embodiment 1 of the present invention.

More specifically, to correct the lateral chromatic aberration, an optical curved-surface S29 is disposed at the light path of the blue light component, as illustrated in FIG. 5, so as to adjust the size of the projected blue image. Moreover, another optical curved-surface S29 is disposed at the light path of the red light component so as to adjust the size of the projected red image. Optical curved-surfaces in accordance with the magnification to be corrected are disposed in the light paths of the blue and red light components. As illustrated in FIG. 5, two optical curved-surfaces S29 are provided on two surfaces of the second polarization beam splitter 6. Thus, an embodiment in which the optical curved-surface S29 is formed in blue light path and red light path, in other words, an embodiment in which the optical curved-surface S29 is arranged on the prism (polarization beam splitter) side meeting both of optical modulating device for red and optical modulating device for blue, is called the first embodiment. The structure of the first embodiment is shown in FIG. 5. In the first embodiment, if there is little difference between the size (magnification) of a red projection image and the size of a blue projection image, the curvature of the two optical curved-surfaces S29 may be the same. If the difference in magnification for the projected red and blue images is great, they may be different. In order to adjust the size (magnification) of a red projection image and a blue projection image, either of the optical curved surface S29 arranged to blue light path and the optical curved surface S29 arranged to red light path may be made as a curved surface, and the other optical curved surface S29 may be made as a plane.

Figure 6:
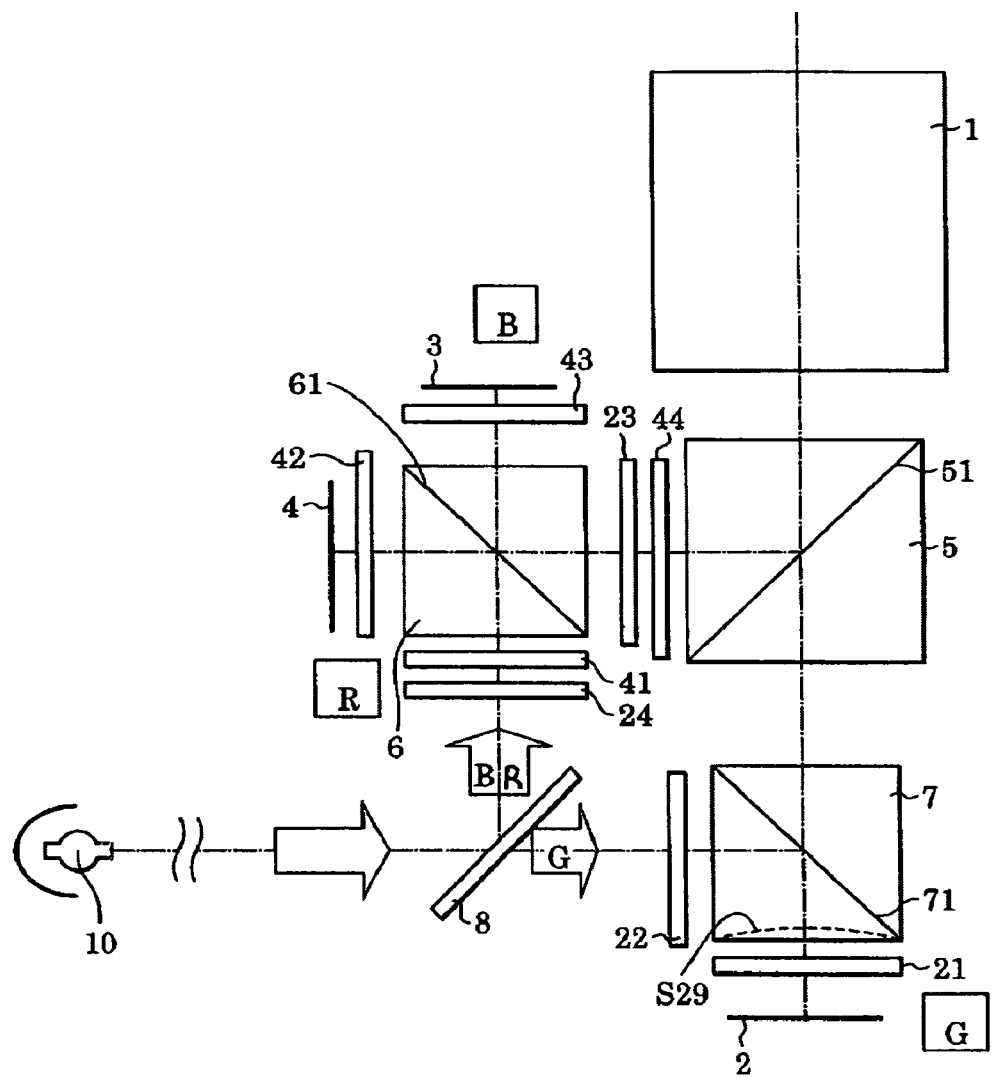
FIG. 6 is a cross-sectional view of a display optical system according to an embodiment 2 of the present invention.

To relatively extend the focal distance of the green light component (that is, in order to make the size of the green projection image closer to the size of a red projection image or a blue projection image), the optical surface (for example, the optical curved-surface S29 of the first polarization beam splitter, as illustrated in FIG. 6) provided in the light path of the green light component may have diverging power. This structure is the structure in which the optical curved-surface is arranged in a green light path. In other words, it is the structure in which the prism surface facing the optical modulating device for green is the optical curved surface. This is referred to as the second embodiment and shown in FIG. 6.

FIG. 1 shows the configuration in which the first and second embodiments are combined. The separate optical curved surface is arranged in each of the red light path, blue light path, and green light path. The curvature of these optical curved surfaces may be the same, and may differ mutually. However, it is desirable that the code of the optical power (refracting power etc.) of the optical curved surface in green light path and the code of the optical power of the optical curved surface in red light path and green light path are reverse code mutually. Optical curved-surfaces having different radii of curvature may be disposed in the three different light paths (red, green, blue light paths) in accordance with the lateral chromatic aberration of the projection lens. In other words, the lateral chromatic aberration may be reduced by combining the effect of the curvature of a plurality of optical surfaces provided at each light path. It may be arranged so that only the optical curved-surface in the green light path and the optical curved-surface in the red light path have curvature and the optical curved-surface in the blue light path is plane. Moreover, it may be arranged so that only the optical curved-surface in the green light path and the optical curved-surface in the blue light path have curvature, and the optical curved-surface in the red light path is plane.

Figure 2:
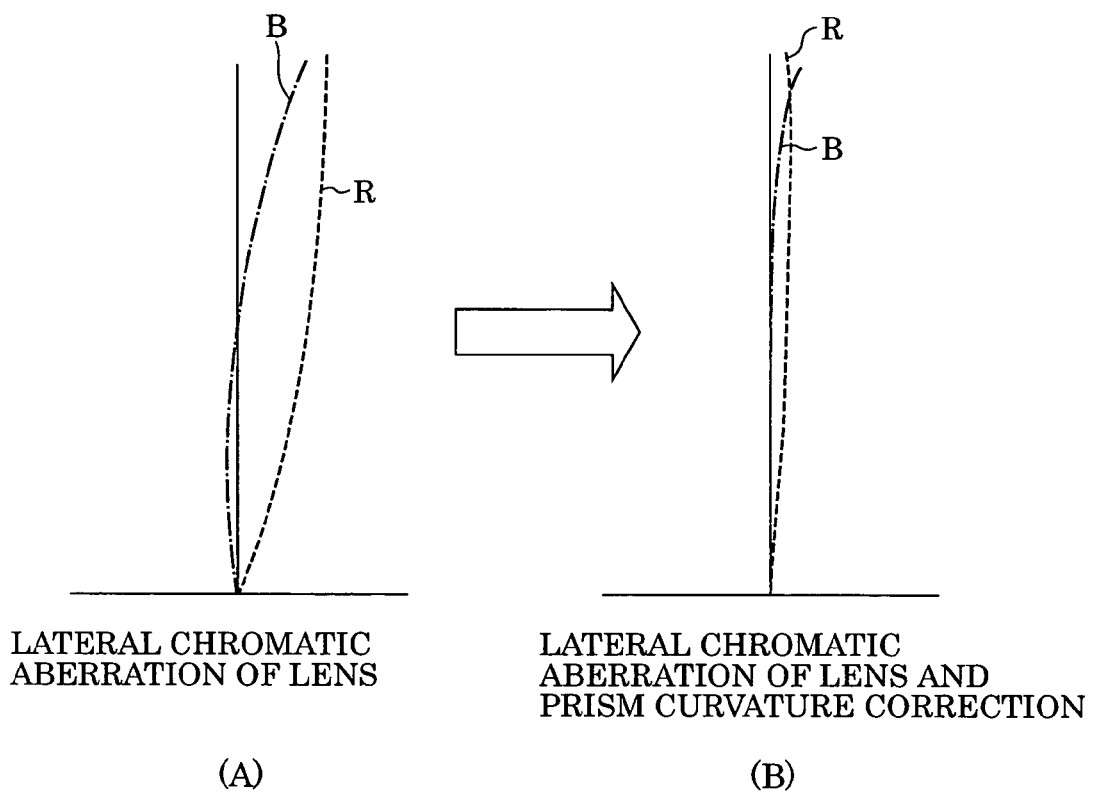
FIG. 2A is a schematic view illustrating the lateral chromatic aberration correction in a known display optical system.
FIG. 2B is a schematic view illustrating the lateral chromatic aberration correction in a known display optical system according to an embodiment of the present invention.

FIGS. 2A and 2B illustrate the overview of the change of the lateral chromatic aberration in an optical system according to the embodiments of the present invention and a known optical system. FIG. 2A illustrates the correction of the lateral chromatic aberration that occurs at the projection lens without any optical curved-surfaces being provided. FIG. 2B illustrates the correction of the lateral chromatic aberration that occurs at the projection lens having optical curved-surfaces interposed between the projection lens and the reflective light-modulating devices. Although axial chromatic aberration occurs, by adjusting the position of the light-modulating devices for red, blue, and green, the red, blue and green images can be formed at the same position. By structuring the projection lens so that it is sufficiently telecentric on the reduction side of the lens, the change in the magnification caused by adjusting the positions of the light-modulating devices for red, blue, and green in the optical axis direction will be extremely small.

By configuring the display optical system according to the present invention as described above, a large amount of lateral chromatic aberration that easily occurs, particularly in a reflective projector that has a long back focus, can be effectively corrected. Moreover, devices such as correction lenses are not required for correcting the lateral chromatic aberration. Accordingly, a reflective projector capable of forming a high quality projection image, as compared to known reflective projectors, is provided.

FIG. 3 and Table 1 show details of the embodiments of the present invention. In FIG. 3, the reference character "ST" represents an aperture stop. Other reference numerals in FIG. 3 represent the same components as those in FIG. 1.

In Table 1, "ri" represents the radius of curvature of an ith surface from the projected surface (enlargement side) and "di" represents the spacing between the ith surface and the (i+1)th surface. More specifically, "r1" represents the radius of curvature of S1, illustrated in FIG. 3. The radius of curvature of a surface S14 (ST) represented by "r14" is infinite since it is the radius of curvature of the aperture stop. Moreover, "r25" represents the radius of curvature of the maximum reduction conjugation side of the projection lens 1 or, in other words, the radius of curvature of a surface S25 closest to the light-modulating devices. Moreover, "r26" represents the radius of curvature of a surface S26 of the polarization beam splitter 5 on the side closer to the projection lens, "r29" represents the radius of curvature of a surface S29 of the polarization beam splitters 6 and 7 closer to the light-modulating device (i.e., opposing the light-modulating device), and "r31" represents the radius of curvature of surfaces of the ¼ wave plates one the side closer to the light-modulating devices, wherein the ¼ wave plates are interposed between the light-modulating devices and the opposing polarization beam splitters. Here, the values of r26, r29, and r31 are infinite. However, the reference character S29 represent a plurality of surfaces opposing the light-modulating devices for each color (the light-modulating devices corresponding to a plurality of colors, such as red, green, and blue). Therefore, the value of r29 may differ for each color of light. The surface S29 may have three different radii of curvature, i.e., different values of r29 for the red, green, and blue light paths. Otherwise, the surface S29 may have two different radii of curvature for the three different light paths, wherein, for example, the values of r29 for the red and blue light paths are the same and the value of r29 of the green light path is different from the value of r29 for the red and blue light paths. Furthermore, ni and vi are the index of refraction and the Abbe number, respectively, for the material forming the ith surface. The shape of aspheric surfaces 3, 4, 22, and 23, as shown in Table 1, is represented by the formula below, wherein X is the direction of the optical axis, H is the direction of an axis orthogonal to the optical axis, R is the paraxial radius of curvature, and K, B, C, D, E, and F are aspherical coefficients, and wherein the traveling direction of light is positive.

$$X = \frac{(1/R)H^2}{1 + \sqrt{\{1 - (1+K)(H/R)^2\}}} + BH^4 + CH^6 + DH^8 + EH^{10} + FH^{12}$$

TABLE 1

| f = 22.10~36.53 fno = 1:1.85-3 Image Height: 2.2 mm | | | |
|---|---|---|---|
| r1 = 93.273 | d1 = 2.50 | n1 = 1.69948 | v1 = 55.5 |
| r2 = 25.163 | d2 = 5.11 | | |
| *r3 = 48.979 | d3 = 3.20 | n2 = 1.53199 | v2 = 55.8 |
| *r4 = 25.617 | d4 = 11.84 | | |
| r5 = −31.401 | d5 = 2.50 | n3 = 1.48898 | v3 = 70.2 |
| r6 = −463.373 | d6 = 5.52 | n4 = 1.81028 | v4 = 40.9 |
| r7 = −48.282 | d7 = variable | | |
| r8 = 61.041 | d8 = 5.60 | n5 = 1.81028 | v5 = 40.9 |
| r9 = −220.290 | d9 = variable | | |
| r10 = −59.091 | d10 = 2.15 | n6 = 1.55069 | v6 = 45.8 |
| r11 = −151.584 | d11 = 29.82 | | |
| r12 = 53.797 | d12 = 4.08 | n7 = 1.48898 | v7 = 70.2 |
| r13 = −98.331 | d13 = 2.32 | | |
| r14 = ∞ (aperture) | d14 = 0.50 | | |
| | d14 = variable | | |
| r15 = −46.591 | d15 = 1.45 | n8 = 1.81185 | v8 = 25.4 |
| r16 = 59.036 | d16 = variable | | |
| r17 = 55.943 | d17 = 1.50 | n9 = 1.81028 | v9 = 40.9 |
| r18 = 31.121 | d18 = 5.70 | n10 = 1.48898 | v10 = 70.2 |
| r19 = 431.105 | d19 = 0.15 | | |
| r20 = 86.284 | d20 = 7.65 | n11 = 1.48898 | v11 = 70.2 |
| r21 = −42.680 | d21 = 0.15 | | |
| *r22 = −450.000 | d22 = 4.30 | n12 = 1.53199 | v12 = 55.8 |
| *r23 = −117.329 | d23 = variable | | |
| r24 = 153.953 | d24 = 3.95 | n13 = 1.81185 | v13 = 25.4 |
| r25 = −119.372 | d25 = 1.45 | | |
| r26 = ∞ | d26 = 31.00 | n14 = 1.84862 | v14 = 24.6 |
| r27 = ∞ | d27 = 3.00 | | |
| r28 = ∞ | d28 = 24.00 | n15 = 1.84862 | v15 = 24.5 |
| r29 = finite | d29 = 3.00 | | |
| r30 = ∞ | d30 = 3.80 | n16 = 1.51805 | v16 = 64.1 |
| r31 = ∞ | | | |
| Focal Distance Variable Spacing | 22.10 | 24.86 | 36.53 |
| d8 | 22.83 | 15.54 | 1.79 |
| d10 | 15.80 | 14.92 | 2.69 |

TABLE 1-continued

| | | | | |
|---|---|---|---|---|
| d16 | 4.93 | 9.19 | 22.71 | |
| d18 | 5.79 | 5.38 | 0.63 | |
| d25 | 0.90 | 5.20 | 22.42 | |

| Aspherical Surface | R | K/F | B | C | D | E |
|---|---|---|---|---|---|---|
| 3 | 4.89791D+01 | 3.64235D+00 | 1.35362D-08 | -2.07779D-09 | -9.30793D-11 | 2.48004D-13 |
| | | -3.12317D-16 | | | | |
| 4 | 2.56175D+01 | -2.61905D+00 | 1.17984D-05 | -2.79026D-08 | -3.84382D-11 | 1.35900D-13 |
| | | -1.69031D-16 | | | | |
| 22 | -4.50000D+02 | -2.83414D+02 | -1.07260D-05 | -2.88376D-08 | 1.10115D-10 | -4.01098D-13 |
| | | 5.03720D-16 | | | | |
| 23 | -1.17329D+02 | -8.68762D+01 | -1.50688D-05 | -7.93145D-09 | 4.30510D-11 | -2.07300D-13 |
| | | 2.56692D-16 | | | | |

Figure 4A:
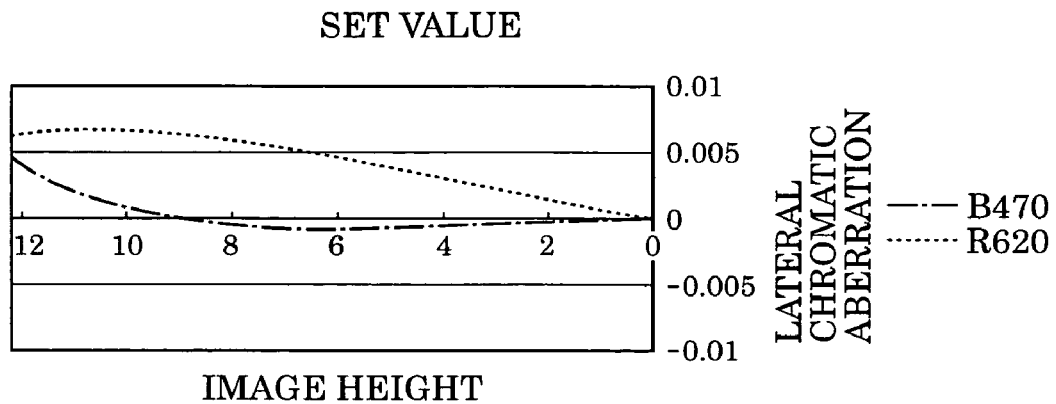
FIG. 4A illustrates the lateral chromatic aberration at the wide-angle end of a known display optical system.
Figure 4B:
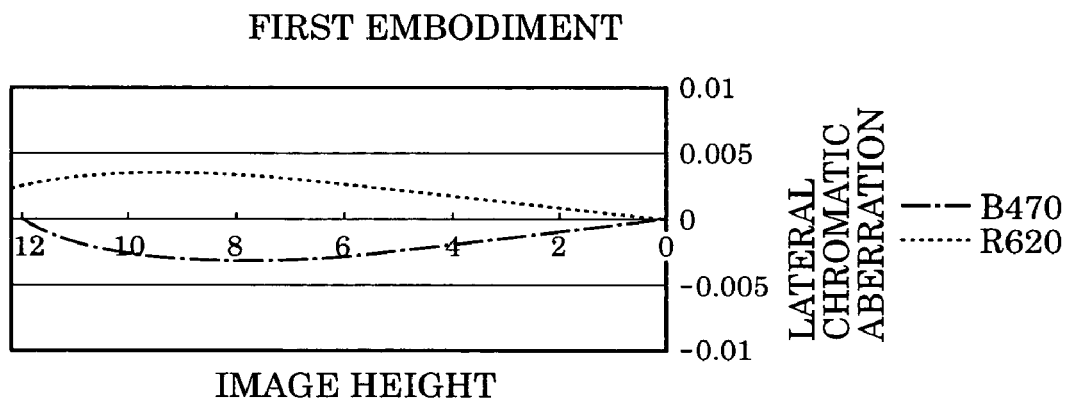
FIG. 4B illustrates the lateral chromatic aberration correction according to a first embodiment of the present invention.
Figure 4C:
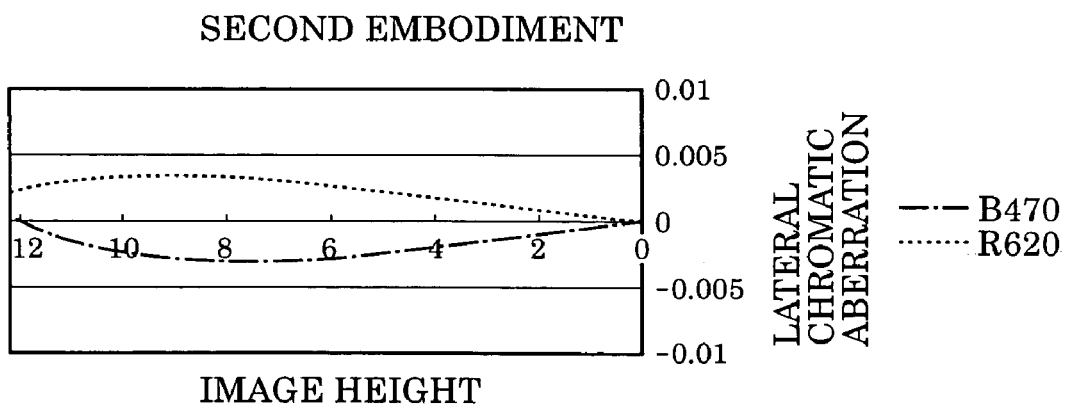
FIG. 4C illustrates the lateral chromatic aberration correction according to a second embodiment of the present invention.

FIG. 4A illustrates the lateral chromatic aberration at the wide-angle end of a projection lens according to the embodiments of the present invention wherein optical curved-surfaces are not provided for correction of the lateral chromatic aberration. FIGS. 4B and 4C illustrate the lateral chromatic aberration at the wide-angle end of a projection lens according to the first or second embodiments of the present invention wherein optical curved-surfaces are provided for correction of the lateral chromatic aberration. FIGS. 4A to 4C show the lateral chromatic aberration for a blue component having a wavelength of 470 nm (shown as a double-dashed chain line) and a red component having a wavelength of 620 nm (shown as a dashed line) wherein the green component having a wavelength of 550 nm is used as a reference.

According to FIG. 4A, large lateral chromatic aberration of the blue component occurs at the peripheral area of the image. If the resolution of the light-modulating device (liquid crystal panel) according to an embodiment of the present invention complies with the extended graphics array standard (XGA: 1,024×768), the size of a pixel included in a 0.7-inch liquid crystal panel is 14 μm. At the peripheral area of the image, the lateral chromatic aberration is almost equivalent to ½ pixel, that is, about 7 μm. As a result, the color shift in the projected image becomes prominent and the resolution is degraded.

In FIG. 4B illustrating the first embodiment of the present invention, an optical curved-surface is provided at a position closest to the light-modulating device in a light path common for both blue and red components. In this case, the lateral chromatic aberration of the blue component is significantly reduced compared to that in FIG. 4A, and the lateral chromatic aberration at the peripheral area of the image is reduced to 5 μm or less. The curvature r29 (the radius of curvature of optical curved-surface S29 of the light-modulating device in the second polarization beam splitter 6 illustrated in FIG. 3 and the optical curved-surface S29 illustrated as a convex surface with a solid line in FIG. 1) of an optical curved-surface provided in a light path of the blue and red components is set as follows:

$r29 = -20{,}000$ mm

FIG. 4C illustrates the lateral chromatic aberration of a display optical system according to the second embodiment of the present invention, wherein the focal distance of the green component is set relatively long. In this case, the curvature r29 (the radius of curvature of optical curved-surface S29 of the light-modulating device in the first polarization beam splitter 7 illustrated in FIG. 3 and the optical curved-surface S29 illustrated as a concave surface with a dashed line in FIG. 1) of an optical curved-surface provided in a light path of the green component is set as follows:

$r29 = 20{,}000$ mm

It may satisfy $|r29| \leq 2Fw$ or $|r29| \leq 5Fw$.

Table 2 shows the relationship between the embodiments of the present invention and the above-mentioned formulae.

TABLE 2

| | Combined Focal Distance (mm) | | |
|---|---|---|---|
| | G (550 nm) | B (470 nm) | R (620 nm) |
| F0 | 22.1013 | 22.0946 | 22.122 |
| F | 22.1088 | 22.08697 | 22.1146 |
| | (r29 = 20000 mm) | (r29 = -20000 mm) | (r29 = -20000 mm) |
| | | (1) (Fg-Fb)/(Fg0-Fb0) | (2) (Fr0-Fg0)/(Fr-Fg) |
| | | 1.537323944 | 1.556390977 |
| | | Fg = Fg0 | Fg = Fg0 |
| | (6) Fg/Fg0 | (5) Fr0/Fr | (4) Fb0/Fb |
| | 1.000339347 | 1.000345453 | 1.000334621 |
| | (8) Fw/fc | | |
| fc = | 23568 | | |
| Fw = | 22.1088 | | |
| Fw/fc = | 0.000938086 | | |

The present invention is not limited to a display optical system according to these embodiments of the present invention and may be applied to display optical systems having other structures.

For example, in the above-described embodiments, white light emitted from a light source is separated into green, blue, and red components. The red component is reflected at and the blue component is transmitted through the second polarization beam splitter 6. Then, the red and blue components are guided to the reflective light-modulating devices for red and blue, respectively. The red and blue components are reflected and modulated at the reflective light-modulating devices. Finally, the red component is transmitted through and the blue component is reflected at the second polarization beam splitter 6 so as to guide the red and blue components to the projection lens. The present invention, however, may be applied to a display optical system that guides the red and blue components to the projection lens in an opposite manner. In other words, white light emitted from a light source is separated into green, blue, and red components. The blue component is reflected at and the red component is transmitted through the second polarization beam splitter 6. Then, the red and blue components are guided to the reflective light-modulating devices for red and blue, respectively. The red and blue components are reflected and modulated at the reflective light-modulating devices. Finally, the blue component is transmitted through and the red component is reflected at the second polarization beam splitter 6 so as to guide the blue and red components to the projection lens. Moreover, the present invention may be applied in a case in which the white light from the light source is separated into blue, red, and two other color components. In the above-mentioned embodiments, a display optical system including three polarization beam splitters constituted of glass blocks was described. The present invention, however, may be applied to a display optical system having more or less than three polarization beam splitters or a display optical system separating and combining color components using optical devices other than polarization beam splitters.

According to the above-mentioned embodiments, white light emitted from a light source is separated into red, green, and blue components. The present invention, however, may be applied to a display optical system that separates white light into other color components (for example, separating visible light into four different components having different wavelengths).

According to the embodiments of the present invention, lateral chromatic aberration can be effectively corrected for a reflective image projector, which typically has a long back-focus and large lateral chromatic aberration. In this way, a projected image having a higher quality can be formed.

According to the embodiments of the present invention, optical curved-surfaces are provided at transmission surfaces of optical devices and bonding surfaces of optical materials forming the optical devices. In this way, a special lens for correcting lateral chromatic aberration and a support mechanism for such a lens are not required.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

Moreover, in this embodiment, although the optical curved-surface(color separation and/or color composition) is arranged on the prism, it may be arranged so that the optical elements (a right lens, a negative lens, etc.) having an optical curved surface is separately provided to the prism and disposed between the projection lens and the optical modulating device.

This application claims priority from Japanese Patent Application No. 2004-093568 filed Mar. 26, 2004, which is hereby incorporated by reference herein.

What is claimed is:

1. An image projector comprising:
   a first reflective light-modulating device configured to reflect and modulate light having a first wavelength range;
   a second reflective light-modulating device configured to reflect and modulate light having a second wavelength range different from the first wavelength range;
   a third reflective light-modulating device configured to reflect and modulate light having a third wavelength range different from the first and second wavelength ranges;
   a color-separating-and-combining optical system configured to separate light from a light source into the lights having the first, second and third wavelength ranges, to guide the lights having the first, second and third wavelength ranges to the first, second and third reflective light-modulating devices respectively, and to combine the outgoing lights from the first, second and third reflective light-modulating devices into a beam, the color-separating-and-combining system including:
   a dichroic mirror separating the light having the first wavelength range from the lights having the second and third wavelength ranges;
   a first polarization beam splitter combining the light having the first wavelength range with the lights having the second and third wavelength ranges,
   a second polarization beam splitter disposed between the dichroic mirror and the first polarization beam splitter, the second polarization beam splitter guiding the light having the first wavelength range from the dichroic mirror to the first reflective light-modulating device and from the first reflective light-modulating device to the first polarization beam splitter; and
   a third polarization beam splitter disposed between the dichroic mirror and the first polarization beam splitter, the third polarization beam splitter guiding the lights having the second and third wavelength ranges from the dichroic mirror to the second and the third reflective light-modulating devices, respectively, combining the light having the second wavelength from the second reflective light-modulating device and the light having the third wavelength from the third reflective light-modulating device, and guiding the combined light to the first polarization beam splitter;
   a projection optical system projecting the beam onto a surface to be projected; and
   at least one optical element of a plurality of optical elements provided on at least one of light paths interposed between the first, second and third reflective light-modulating devices and the projection optical system, including an optical curved-surface having a finite radius of curvature,
   wherein a wavelength of the light having the second wavelength range is shorter than a wavelength of the light having the first wavelength range,
   wherein a wavelength of the light having the third wavelength range is longer than the wavelength of the light having the first wavelength range,
   wherein the optical curved-surfaces are provided on the light paths of the lights having the second and third wavelength ranges, respectively, and
   wherein a combined focal length of the projection optical system and the plurality of optical elements disposed between the projection optical system and either the second or third reflective light-modulating devices is shorter than a combined focal length of the projection optical system and a plurality of optical elements disposed between the first reflective light-modulating device and the projection optical system.

2. The image projector according to claim 1,
   wherein a wavelength of the light having the second wavelength range is shorter than a wavelength of the light having the first wavelength range,
   wherein a wavelength of the light having the third wavelength range is longer than the wavelength of the light having the first wavelength range, wherein the optical curved-surfaces are provided on the light path of the light having the first wavelength range, and wherein a combined focal length of the projection optical system and a plurality of optical elements disposed between the first reflective light-modulating device and the projection optical system is longer than a combined focal length of the projection optical system and a plurality of optical elements disposed between the projection optical system and either the second or third reflective light-modulating devices.

3. The imaging projector according to claim 1, wherein the imaging projector satisfies at least one of the formulae:

$1.5 < (F_1 - F_2)/(F_1 0 - F_2 0) < 4.0$ and $1.5 < (F_3 0 - F_1 0)/(F_3 - F_1) < 4.0,$ wherein $F_1$, $F_2$, and $F_3$ represent each of combined focal lengths of a plurality of optical elements, disposed between the first, second and third reflective light-modulating devices, and the projection optical system, respectively, and the projection optical system to the lights having the first, second and third wavelength ranges, respectively, and wherein $F_1 0$, $F_2 0$, and $F_3 0$ represent each of focal lengths of the projection optical system to the lights having the first, second and third wavelength ranges when the optical curved-surfaces are not provided on the light paths.

4. The imaging projector according to claim 1, wherein the optical curved-surface is formed on one of incidence and exit surfaces of a bonded element composed of two optical elements bonded to each other, a bonded surface of the bonded element, a surface of a wavelength-selective polarization rotating element, and a surface of a polarization changing element.

5. The imaging projector according to claim 1, wherein the apparatus satisfies a formula:

$L < 2.1D$, and wherein L represents a length of the light path in air between the projection optical system and at least one of the first, second and third reflective light-modulating devices, and D represents a diagonal size of the at least one of the first, second and third reflective light-modulating devices.

6. An apparatus according to claim 1, wherein the apparatus satisfies a formula:

$|Fw/fc| < 0.002$, and wherein Fw represents a focal distance of the wide-angle end of the projection optical system, and fc represents a focal length of the optical curved-surface.

7. The apparatus according to claim 1, wherein each of the first, second and the third polarization beam splitters includes a bonded element composed of two optical elements bonded to each other, by sandwiching a multilayer film performing as a polarization splitting surface therebetween.

8. An image projector comprising:

a first reflective light-modulating device configured to reflect and modulate light having a first wavelength range;

a second reflective light-modulating device configured to reflect and modulate light having a second wavelength range different from the first wavelength range;

a third reflective light-modulating device configured to reflect and modulate light having a third wavelength range different from the first and second wavelength ranges;

a color-separating-and-combining optical system configured to separate light from a light source into the lights having the first, second and third wavelength ranges, to guide the lights having the first, second and third wavelength ranges to the first, second and third reflective light-modulating devices respectively, and to combine the outgoing lights from the first, second and third reflective light-modulating devices into a beam, the color-separating-and-combining system including:

a dichroic mirror separating the light having the first wavelength range from the lights having the second and third wavelength ranges;

a first polarization beam splitter combining the light having the first wavelength range with the lights having the second and third wavelength ranges, a second polarization beam splitter disposed between the dichroic mirror and the first polarization beam splitter, the second polarization beam splitter guiding the light having the first wavelength range from the dichroic mirror to the first reflective light-modulating device and from the first reflective light-modulating device to the first polarization beam splitter; and a third polarization beam splitter disposed between the dichroic mirror and the first polarization beam splitter, the third polarization beam splitter guiding the lights having the second and third wavelength ranges from the dichroic mirror to the second and the third reflective light-modulating devices, respectively, combining the light having the second wavelength from the second reflective light-modulating device and the light having the third wavelength from the third reflective light-modulating device, and guiding the combined light to the first polarization beam splitter;

a projection optical system projecting the beam onto a surface to be projected; and at least one optical element of a plurality of optical elements provided on at least one of light paths interposed between the first, second and third reflective light-modulating devices and the projection optical system, including an optical curved-surface having a finite radius of curvature, wherein a wavelength of the light having the second wavelength range is shorter than a wavelength of the light having the first wavelength range, wherein a wavelength of the light having the third wavelength range is longer than the wavelength of the light having the first wavelength range, wherein the optical curved-surfaces are provided on the light path of the light having the first wavelength range, and wherein a combined focal length of the projection optical system and a plurality of optical elements disposed between the first reflective light-modulating device and the projection optical system is longer than a combined focal length of the projection optical system and a plurality of optical elements disposed between the projection optical system and either the second or third reflective light-modulating devices.

9. An image projector comprising:
a first reflective light-modulating device configured to reflect and modulate light having a first wavelength range;
a second reflective light-modulating device configured to reflect and modulate light having a second wavelength range different from the first wavelength range;
a third reflective light-modulating device configured to reflect and modulate light having a third wavelength range different from the first and second wavelength ranges;
a color-separating-and-combining optical system configured to separate light from a light source into the lights having the first, second and third wavelength ranges, to guide the lights having the first, second and third wavelength ranges to the first, second and third reflective light-modulating devices respectively, and to combine the outgoing lights from the first, second and third reflective light-modulating devices into a beam, the color-separating-and-combining system including:
  a dichroic mirror separating the light having the first wavelength range from the lights having the second and third wavelength ranges;
  a first polarization beam splitter combining the light having the first wavelength range with the lights having the second and third wavelength ranges,
  a second polarization beam splitter disposed between the dichroic mirror and the first polarization beam splitter, the second polarization beam splitter guiding the light having the first wavelength range from the dichroic mirror to the first reflective light-modulating device and from the first reflective light-modulating device to the first polarization beam splitter; and
  a third polarization beam splitter disposed between the dichroic mirror and the first polarization beam splitter, the third polarization beam splitter guiding the lights having the second and third wavelength ranges from the dichroic mirror to the second and the third reflective light-modulating devices, respectively, combining the light having the second wavelength from the second reflective light-modulating device and the light having the third wavelength from the third reflective light-modulating device, and guiding the combined light to the first polarization beam splitter;
a projection optical system projecting the beam onto a surface to be projected; and
at least one optical element of a plurality of optical elements provided on at least one of light paths interposed between the first, second and third reflective light-modulating devices and the projection optical system, including an optical curved-surface having a finite radius of curvature,
wherein the imaging projector satisfies at least one of the formulae:

$$1.5 < (F_1 - F_2)/(F_1 0 - F_2 0) < 4.0$$

and $$1.5 < (F_3 0 - F_1 0)/(F_3 - F_1) < 4.0,$$

wherein $F_1$, $F_2$, and $F_3$ represent each of combined focal lengths of a plurality of optical elements, disposed between the first, second and third reflective light-modulating devices, and the projection optical system, respectively, and the projection optical system to the lights having the first, second and third wavelength ranges, respectively, and
wherein $F_1 0$, $F_2 0$, and $F_3 0$ represent each of focal lengths of the projection optical system to the lights having the first, second and third wavelength ranges when the optical curved-surfaces are not provided on the light paths.

10. An image projector comprising:
a first reflective light-modulating device configured to reflect and modulate light having a first wavelength range;
a second reflective light-modulating device configured to reflect and modulate light having a second wavelength range different from the first wavelength range;
a third reflective light-modulating device configured to reflect and modulate light having a third wavelength range different from the first and second wavelength ranges;
a color-separating-and-combining optical system configured to separate light from a light source into the lights having the first, second and third wavelength ranges, to guide the lights having the first, second and third wavelength ranges to the first, second and third reflective light-modulating devices respectively, and to combine the outgoing lights from the first, second and third reflective light-modulating devices into a beam, the color-separating-and-combining system including:
  a dichroic mirror separating the light having the first wavelength range from the lights having the second and third wavelength ranges;
  a first polarization beam splitter combining the light having the first wavelength range with the lights having the second and third wavelength ranges,
  a second polarization beam splitter disposed between the dichroic mirror and the first polarization beam splitter, the second polarization beam splitter guiding the light having the first wavelength range from the dichroic mirror to the first reflective light-modulating device and from the first reflective light-modulating device to the first polarization beam splitter; and
  a third polarization beam splitter disposed between the dichroic mirror and the first polarization beam splitter, the third polarization beam splitter guiding the lights having the second and third wavelength ranges from the dichroic mirror to the second and the third reflective light-modulating devices, respectively, combining the light having the second wavelength from the second reflective light-modulating device and the light having the third wavelength from the third reflective light-modulating device, and guiding the combined light to the first polarization beam splitter;
a projection optical system projecting the beam onto a surface to be projected; and
at least one optical element of a plurality of optical elements provided on at least one of light paths interposed between the first, second and third reflective light-modulating devices and the projection optical system, including an optical curved-surface having a finite radius of curvature,
wherein the apparatus satisfies a formula:

$$L < 2.1D, \text{ and}$$

wherein L represents a length of the light path in air between the projection optical system and at least one of the first, second and third reflective light-modulating devices, and D represents a diagonal size of the at least one of the first, second and third reflective light-modulating devices.

11. An image projector comprising:
a first reflective light-modulating device configured to reflect and modulate light having a first wavelength range;
a second reflective light-modulating device configured to reflect and modulate light having a second wavelength range different from the first wavelength range;
a third reflective light-modulating device configured to reflect and modulate light having a third wavelength range different from the first and second wavelength ranges;
a color-separating-and-combining optical system configured to separate light from a light source into the lights having the first, second and third wavelength ranges, to guide the lights having the first, second and third wavelength ranges to the first, second and third reflective light-modulating devices respectively, and to combine the outgoing lights from the first, second and third reflective light-modulating devices into a beam, the color-separating-and-combining system including:
 a dichroic mirror separating the light having the first wavelength range from the lights having the second and third wavelength ranges;
 a first polarization beam splitter combining the light having the first wavelength range with the lights having the second and third wavelength ranges,
 a second polarization beam splitter disposed between the dichroic mirror and the first polarization beam splitter, the second polarization beam splitter guiding the light having the first wavelength range from the dichroic mirror to the first reflective light-modulating device and from the first reflective light-modulating device to the first polarization beam splitter; and
 a third polarization beam splitter disposed between the dichroic mirror and the first polarization beam splitter, the third polarization beam splitter guiding the lights having the second and third wavelength ranges from the dichroic mirror to the second and the third reflective light-modulating devices, respectively, combining the light having the second wavelength from the second reflective light-modulating device and the light having the third wavelength from the third reflective light-modulating device, and guiding the combined light to the first polarization beam splitter;
a projection optical system projecting the beam onto a surface to be projected; and
at least one optical element of a plurality of optical elements provided on at least one of light paths interposed between the first, second and third reflective light-modulating devices and the projection optical system, including an optical curved-surface having a finite radius of curvature,
wherein the apparatus satisfies a formula:

$$|Fw/fc|<0.002,$$

and wherein Fw represents a focal distance of the wide-angle end of the projection optical system, and fc represents a focal length of the optical curved-surface.

* * * * *